US006441838B1

(12) United States Patent
Hindman et al.

(10) Patent No.: US 6,441,838 B1
(45) Date of Patent: Aug. 27, 2002

(54) METHOD OF TREATING A METAL SURFACE TO INCREASE POLYMER ADHESION

(75) Inventors: Gregory T. Hindman, Albany, OR (US); Domingo A. Figueredo, Livermore, CA (US); Ronald L. Enck, Corvallis, OR (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/765,825

(22) Filed: Jan. 19, 2001

(51) Int. Cl.[7] .................................................. G01D 9/28
(52) U.S. Cl. ........................................................ 346/63
(58) Field of Search ............................ 347/63, 56, 64, 347/61, 54, 47, 40, 20, 65, 59, 12, 15, 42, 87, 19; 216/27, 4, 48; 29/890.1; 430/311

(56) References Cited

U.S. PATENT DOCUMENTS

| | | | |
|---|---|---|---|
| 4,169,032 | A | 9/1979 | Haase et al. |
| 4,474,642 | A | 10/1984 | Nakane et al. |
| 4,535,343 | A | 8/1985 | Wright et al. |
| 4,719,477 | A | 1/1988 | Hess |
| 4,824,716 | A | 4/1989 | Yerman |
| 5,278,584 | A | 1/1994 | Keefe et al. |
| 5,317,346 | A | 5/1994 | Garcia |
| 5,469,199 | A | 11/1995 | Allen et al. |
| 5,812,158 | A | 9/1998 | Murthy et al. |
| 5,983,829 | A | 11/1999 | Suzuki |
| 6,037,664 | A | 3/2000 | Zhao et al. |

OTHER PUBLICATIONS

"Plasma Polymerization of Fluorocarbons," d'Agostino, Cramarossa, Fracassi & Illuzzi, Chapter 2 of Plasma Deposition, Treatment, and Etching of Polymers, Riccardo d'Agostino, Ed., Academic Press, Inc., San Diego, 1990, pp. 95–162.

"Development of the Thin–Film Structure for the ThinkJet Printhead," Bhaskar & Aden, Hewlett–Packard Journal, vol. 36, No. 5, May 1985, pp. 27–33.

"Development of a High–Resolution Thermal Inkjet Printhead," Buskirk, Hackleman, Hall, Kanarek, Low, Trueba, Van de Poll, Hewlett–Packard Journal, vol. 39, No. 5, Oct. 1988, pp. 55–61.

"The Third–Generation HP Thermal InkJet Printhead," Aden, Bohorquez, Collins, Crook, Garcia & Hess, Hewlett–Packard Journal, vol. 45, No. 1, Feb. 1994, pp. 41–45.

*Primary Examiner*—Raquel Yvette Gordon

(57) ABSTRACT

A thermal ink jet printhead that includes a thin film substrate including a plurality of thin film layers, a plurality of ink firing heater resistors defined in the plurality of thin film layers, a patterned tantalum layer disposed on said plurality of thin film layers, a barrier adhesion layer disposed on the patterned tantalum layer, an ink barrier layer disposed over the barrier adhesion layer, and respective ink chambers formed in the ink barrier layer over respective thin film resistors, each chamber formed by a chamber opening in barrier layer, the barrier adhesion layer more particularly comprises a tantalum nitride layer or a deposited tantalum, carbon, fluorine, and oxygen containing layer that is formed pursuant to exposure of the patterned tantalum layer to a plasma that includes a fluorinated hydrocarbon such as carbon tetrafluoride ($CF_4$), fluoroform ($CHF_3$), hexafluoroethane ($C_2F_6$), difluoromethane ($CH_2F_2$), pentafluoroethane ($C_2HF_5$), tetrafluoroethane ($C_2H_2F_4$), or octafluorobutene ($C_4F_8$).

22 Claims, 3 Drawing Sheets

METHOD OF TREATING A METAL SURFACE TO INCREASE POLYMER ADHESION

This application is related to commonly assigned copending U.S. application Ser. No. 08/938,346, filed herewith, entitled "IMPROVED INK-JET PRINTHEAD AND METHOD FOR PRODUCING THE SAME", incorporated herein by reference; commonly assigned copending U.S. application Ser. No. 08/811,404, filed Mar. 4, 1997, entitled "STRUCTURE TO EFFECT ADHESION BETWEEN SUBSTRATE AND INK BARRIER IN AN INK JET PRINTHEAD", incorporated herein by reference; and commonly assigned copending U.S. application Ser. No. 08/811,403, filed Mar. 4, 1997, entitled "TRANSITION METAL CARBIDE FILMS FOR APPLICATIONS IN INK JET PRINTHEAD", incorporated herein by reference.

BACKGROUND OF THE INVENTION

The subject invention generally relates to ink jet printing, and more particularly to thin film ink jet printheads for ink jet cartridges and methods for manufacturing such printheads.

The art of ink jet printing is relatively well developed. Commercial products such as computer printers, graphics plotters, and facsimile machines have been implemented with ink jet technology for producing printed media. The contributions of Hewlett-Packard Company to ink jet technology are described, for example, in various articles in the *Hewlett-Packard Journal*, Vol. 36, No. 5 (May 1985); Vol. 39, No. 5 (October 1988); Vol. 43, No. 4 (August 1992); Vol. 43, No. 6 (December 1992); and Vol. 45, No. 1 (February 1994); all incorporated herein by reference.

Generally, an ink jet image is formed pursuant to precise placement on a print medium of ink drops emitted by an ink drop generating device known as an ink jet printhead. Typically, an ink jet printhead is supported on a movable carriage that traverses over the surface of the print medium and is controlled to eject drops of ink at appropriate times pursuant to command of a microcomputer or other controller, wherein the timing of the application of the ink drops is intended to correspond to a pattern of pixels of the image being printed.

A typical Hewlett-Packard ink jet printhead includes an array of precisely formed nozzles in an orifice plate that is attached to an ink barrier layer which in turn is attached to a thin film substructure that implements ink firing heater resistors and apparatus for enabling the resistors. The ink barrier layer defines ink channels including ink chambers disposed over associated ink firing resistors, and the nozzles in the orifice plate are aligned with associated ink chambers. Ink drop generator regions are formed by the ink chambers and portions of the thin film substructure and the orifice plate that are adjacent to the ink chambers.

The thin film substructure is typically comprised of a substrate such as silicon on which are formed various thin film layers that form thin film ink firing resistors, apparatus for enabling the resistors, and also intercon- nections to bonding pads that are provided for external electrical connections to the printhead. The thin film substructure more particularly includes a top thin film layer of tantalum disposed over the resistors as a thermomechanical passivation layer.

The ink barrier layer is typically a polymer material that is laminated as a dry film to the thin film substructure, and is designed to be photodefinable and both UV and thermally curable.

An example of the physical arrangement of the orifice plate, ink barrier layer, and thin film substructure is illustrated at page 44 of the *Hewlett-Packard Journal* of February 1994, cited above. Further examples of ink jet printheads are set forth in commonly assigned U.S. Pat. No. 4,719,477 and U.S. Pat. No. 5,317,346, both of which are incorporated herein by reference.

A consideration with the foregoing ink jet printhead architecture includes delamination of the ink barrier layer from the thin film substructure. Delamination principally occurs from environmental moisture and the ink itself which is in continual contact with the edges of the thin film substructure/barrier interface in the drop generator regions.

It has been determined that the tantalum thermomechanical passivation layer offers the additional functionality of improving adhesion to the ink barrier layer. However, while the barrier adhesion to tantalum has proven to be sufficient for printheads that are incorporated into disposable ink jet cartridges, barrier adhesion to tantalum is not sufficiently robust for semi-permanent ink jet printheads which are not replaced as frequently. Moreover, new developments in ink chemistry have resulted in formulations that more aggressively debond the interface between the thin film substructure and the barrier layer, as well as the interface between the barrier layer and the orifice plate.

In particular, water from the ink enters the thin film substructure/barrier interface by penetration through the bulk of the barrier and penetration along the thin film substructure/barrier interface, causing debonding of the interfaces through a chemical mechanism such as hydrolysis.

The problem with tantalum as a bonding surface is due to the fact that while the tantalum layer is pure tantalum when it is first formed in a sputtering apparatus, a tantalum oxide layer forms as soon as the tantalum layer is exposed to an oxygen containing atmosphere. The chemical bond between an oxide and a polymer film tends to be easily degraded by water, since the water forms a hydrogen bond with the oxide that competes with and replaces the original polymer to oxide bond, and thus ink formulations, particularly the more aggressive ones, debond an interface between a metal oxide and a polymer barrier.

SUMMARY OF THE INVENTION

It would therefore be an advantage to provide an improved ink jet printhead that reduces delamination of the interface between the thin film substructure and the ink barrier layer.

A further advantage would be to provide in a ink jet printhead a bonding surface that provides bonding sites to which a polymer barrier layer can form a stable chemical bond.

The invention is generally employed in an ink jet printhead that includes a thin film substrate including a plurality of thin film layers, a plurality of ink firing heater resistors defined in the plurality of thin film layers, a barrier adhesion layer disposed on the plurality of thin film layers, an ink barrier layer disposed on the barrier adhesion layer, and respective ink chambers formed in the ink barrier layer over respective thin film resistors, each chamber formed by a chamber opening in barrier layer.

In accordance with one aspect of the invention, the barrier adhesion layer comprises a deposited transition layer which after exposure to air contains tantalum, carbon, fluorine, and oxygen, and which is formed pursuant to exposure of the patterned tantalum layer to a plasma that includes a fluorinated hydrocarbon such as carbon tetrafluoride ($CF_4$), fluoroform ($CHF_3$), hexafluoroethane ($C_2F6$), difluoromethane ($CH_2F_2$), pentafluoroethane ($C_2HF_5$), tetrafluoroethane ($C_2H_2F_4$), or octafluorobutene ($C_4F_8$).

In accordance with a further aspect of the invention the ink barrier adhesion layer comprises a tantalum nitride layer.

BRIEF DESCRIPTION OF THE DRAWINGS

The advantages and features of the disclosed invention will readily be appreciated by persons skilled in the art from the following detailed description when read in conjunction with the drawing wherein.

DETAILED DESCRIPTION OF THE DISCLOSURE

Figure 1:
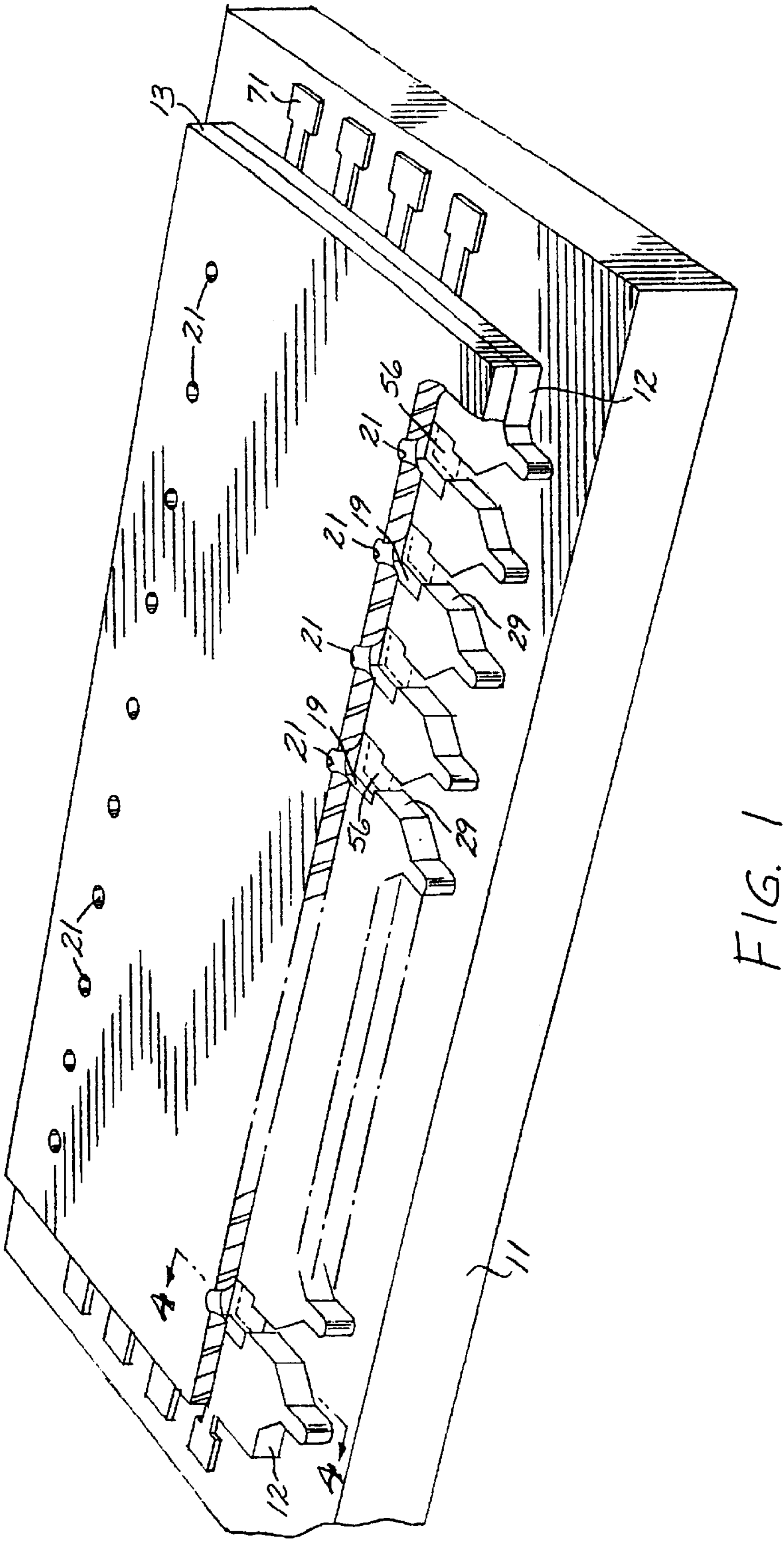
FIG. 1 is a schematic, partially sectioned perspective view of an ink jet printhead in accordance with the invention.

In the following detailed description and in the several figures of the drawing, like elements are identified with like reference numerals.

Referring now to FIG. 1, set forth therein is an unscaled schematic perspective view of an ink jet printhead in which the invention can be employed and which generally includes (a) a thin film substructure or die 11 comprising a substrate such as silicon and having various thin film layers formed thereon, (b) an ink barrier layer 12 disposed on the thin film substructure 11, and (c) an orifice or nozzle plate 13 attached to the top of the ink barrier 12.

The thin film substructure 11 is formed pursuant to integrated circuit fabrication techniques, and includes thin film heater resistors 56 formed therein. By way of illustrative example, the thin film heater resistors 56 are located in rows along longitudinal edges of the thin film substructure.

The ink barrier layer 12 is formed of a dry film that is heat and pressure laminated to the thin film substructure 11 and photodefined to form therein ink chambers 19 and ink channels 29 which are disposed over resistor regions which are on either side of a generally centrally located gold layer 62 (FIG. 2) on the thin film substructure 11. Gold bonding pads 71 engagable for external electrical connections are disposed at the ends of the thin film substructure 11 and are not covered by the ink barrier layer 12. As discussed further herein with respect to FIG. 2, the thin film substructure 11 includes a patterned gold layer 62 generally disposed in the middle of the thin film substructure 11 between the rows of heater resistors 56, and the ink barrier layer 12 covers most of such patterned gold layer 62, as well as the areas between adjacent heater resistors 56. By way of illustrative example, the barrier layer material comprises an acrylate based photopolymer dry film such as the "Parade" brand photopolymer dry film obtainable from E.I. duPont de Nemours and Company of Wilmington, Del. Similar dry films include other duPont products such as the "Riston" brand dry film and dry films made by other chemical providers. The orifice plate 13 comprises, for example, a planar substrate comprised of a polymer material and in which the orifices are formed by laser ablation, for example as disclosed in commonly assigned U.S. Pat. No. 5,469,199, incorporated herein by reference. The orifice plate can also comprise, by way of further example, a plated metal such as nickel.

The ink chambers 19 in the ink barrier layer 12 are more particularly disposed over respective ink firing resistors 56, and each ink chamber 19 is defined by the edge or wall of a chamber opening formed in the barrier layer 12. The ink channels 29 are defined by further openings formed in the barrier layer 12, and are integrally joined to respective ink firing chambers 19. By way of illustrative example, FIG. 1 illustrates an outer edge fed configuration wherein the ink channels 29 open towards an outer edge formed by the outer perimeter of the thin film substructure 11 and ink is supplied to the ink channels 29 and the ink chambers 19 around the outer edges of the thin film substructure, for example as more particularly disclosed in commonly assigned U.S. Pat. No. 5,278,584, incorporated herein by reference. The invention can also be employed in a center edge fed ink jet printhead such as that disclosed in previously identified U.S. Pat. No. 5,317,346, wherein the ink channels open towards an edge formed by a slot in the middle of the thin film substructure.

The orifice plate 13 includes orifices 21 disposed over respective ink chambers 19, such that an ink firing resistor 56, an associated ink chamber 19, and an associated orifice 21 are aligned. An ink drop generator region is formed by each ink chamber 19 and portions of the thin film substructure 11 and the orifice plate 13 that are adjacent the ink chamber 19.

Figure 2:
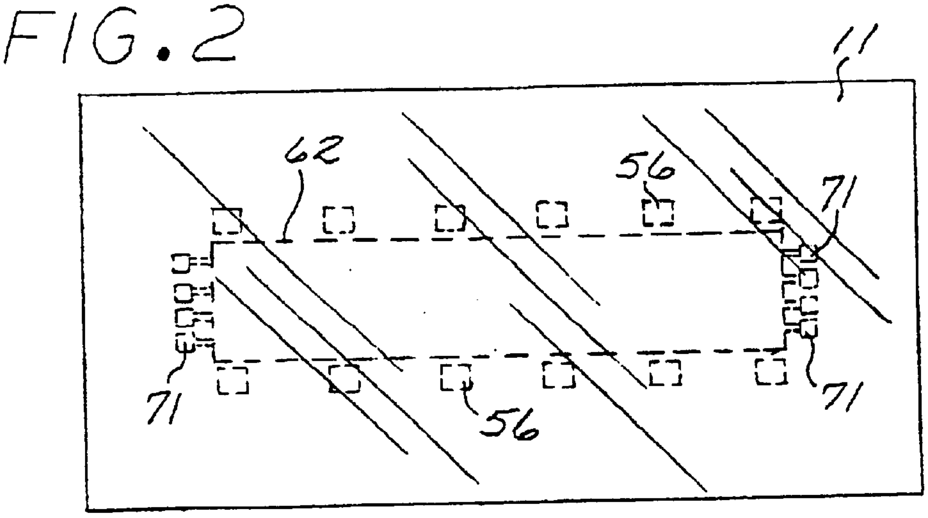
FIG. 2 is an unscaled schematic top plan illustration of the general layout of the thin film substructure of the ink jet printhead of FIG. 1.

Referring now to FIG. 2, set forth therein is an unscaled schematic top plan illustration of the general layout of the thin film substructure 11. The ink firing resistors 56 are formed in resistor regions that are adjacent the longitudinal edges of the thin film substructure 11. A patterned gold layer 62 comprised of gold traces forms the top layer of the thin film structure in a gold layer region located generally in the middle of the thin film substructure 11 between the resistor regions and extending between the ends of the thin film substructure 11. Bonding pads 71 for external connections are formed in the patterned gold layer 62, for example adjacent the ends of the thin film substructure 11. The ink barrier layer 12 is defined so as to cover all of the patterned gold layer 62 except for the bonding pads 71, and also to cover the areas between the respective openings that form the ink chambers and associated ink channels. Depending upon implementation, one or more thin film layers can be disposed over the patterned gold layer 62.

Figure 3:
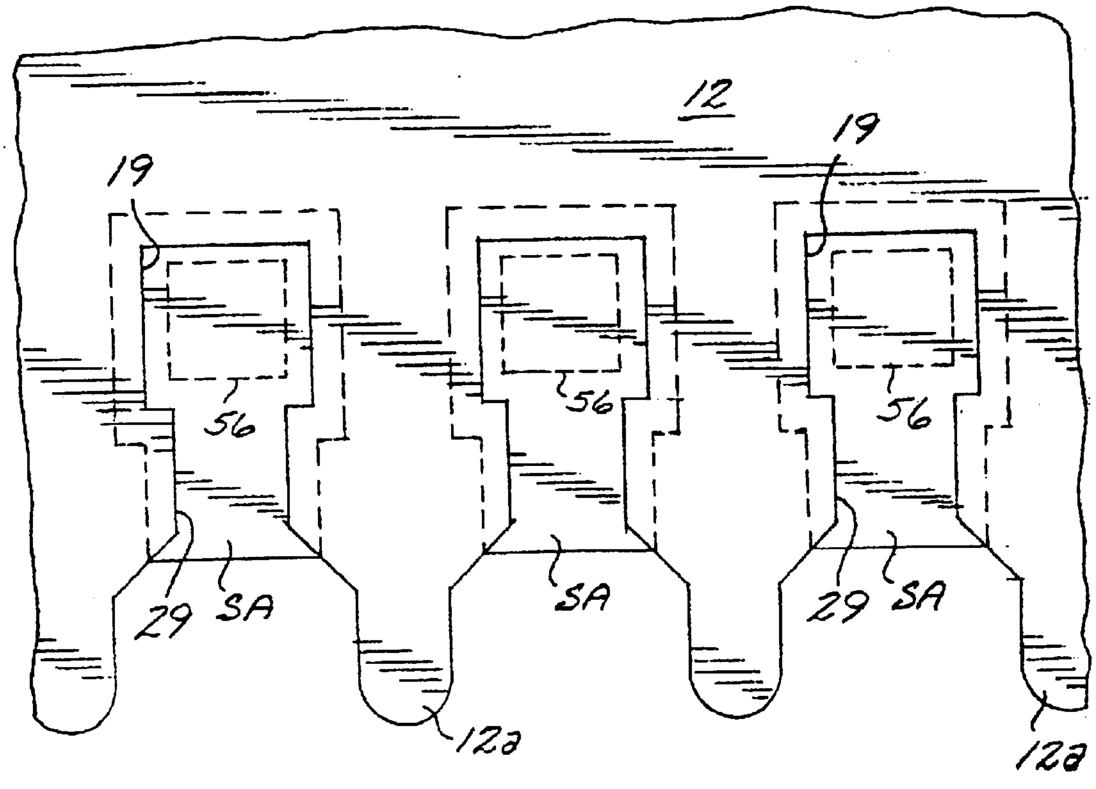
FIG. 3 is an unscaled schematic top plan view illustrating the configuration of a plurality of representative heater resistors, ink chambers and associated ink channels.

Referring now to FIG. 3, set forth therein is an unscaled schematic top plan view illustrating the configuration of a plurality of representative heater resistors 56, ink chambers 19 and associated ink channels 29. As shown in FIG. 3, the heater resistors 56 are polygon shaped (e.g., rectangular) and are enclosed on at least two sides thereof by the wall of an ink chamber 19 which for example can be multi-sided. The ink channels 29 extend away from associated ink chambers 19 and can become wider at some distance from the ink chambers 19. Insofar as adjacent ink channels 29 generally extend in the same direction, the portions of the ink barrier layer 12 that form the openings that define ink chambers 19 and ink channels 29 thus form an array of barrier tips **12*a* that extend toward an adjacent feed edge of the thin film substructure 11 from a central portion of the barrier layer 12 that covers the patterned gold layer 62 and is on the side of the heater resistors 56 away from the adjacent feed edge. Stated another way, ink chambers 19 and associated ink channels 29 are formed by an array of side by side barrier tips 12_a_ that extend from a central portion of the ink barrier 12 toward a feed edge of the thin film substructure 11**.

The thin film substructure 11 further includes a barrier adhesion layer (layer 63 in FIG. 4, and layer 163 in FIG. 5) that overlies a patterned tantalum layer and functions as an adhesion layer for the ink barrier layer 12. In accordance with the invention, the adhesion layer comprises a tantalum nitride layer or film 63 (FIG. 4) or a deposited transition layer film 163 (FIG. 5) which after exposure to air contains tantalum, carbon, fluorine, and oxygen, and which is formed pursuant to exposure of the patterned tantalum layer to a plasma that includes a fluorinated hydrocarbon such as carbon tetrafluoride ($CF_4$), fluoroform ($CHF_3$), hexafluoroethane ($C_2F_6$), difluoromethane ($CH_2F_2$), pentafluoroethane ($C_2HF_5$), tetrafluoroethane ($C_2H_2F_4$), octafluorobutene ($C_4F_8$). As described further herein, the adhesion layer can comprise a blanket film that covers most of the thin film substructure (as for example illustrated in FIG. 4 for an adhesion layer comprised of tantalum nitride), or subareas that are located beneath respective ink chambers (as for example illustrated in FIG. 5 for a tantalum, carbon, fluorine and oxygen containing adhesion layer formed pursuant to plasma treatment of a tantalum layer). The adhesion layer subareas would be configured, for example, in accordance with the subareas SA depicted in FIG. 3.

Figure 4:
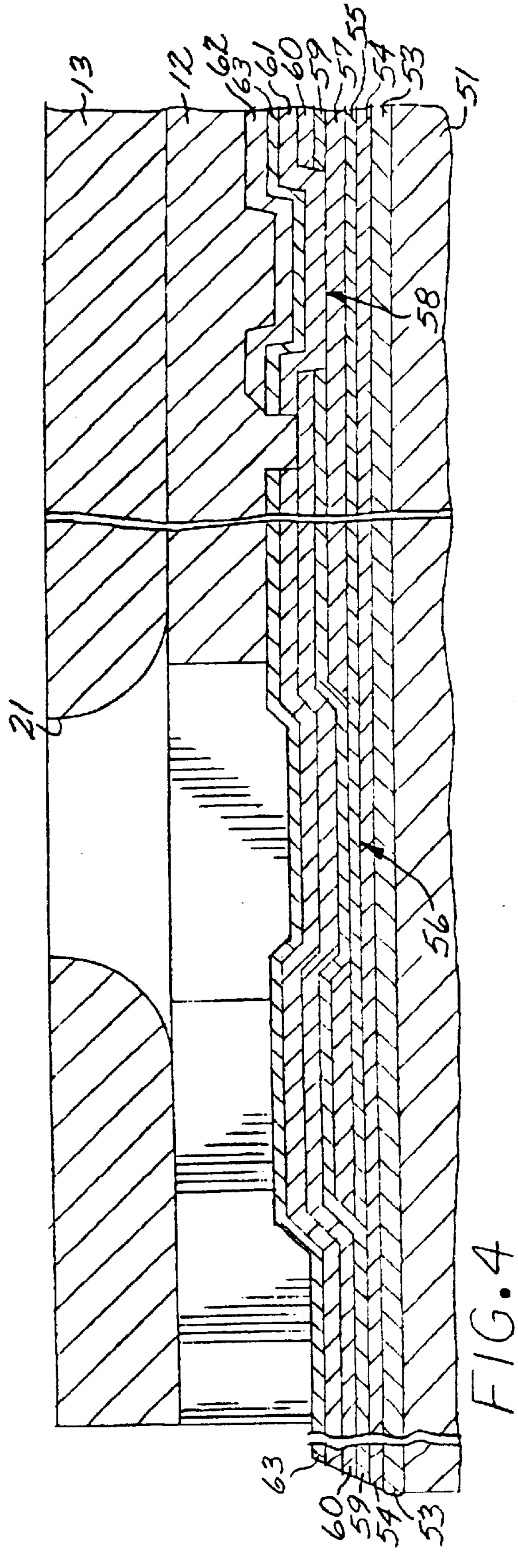
FIG. 4 is an unscaled schematic cross sectional view of the ink jet printhead of FIG. 1 taken laterally through a representative ink drop generator region and illustrating an embodiment of the printhead of FIG. 1.

Referring now to FIG. 4, set forth therein is an unscaled schematic cross sectional view of the ink jet printhead of FIG. 1 taken through a representative ink drop generator region and a portion of the centrally located gold layer region, and illustrating a specific embodiment of the thin film substructure 11 that includes a blanket tantalum nitride adhesion layer. The thin film substructure 11 of the ink jet printhead of FIG. 4 more particularly includes a silicon substrate 51, a field oxide layer 53 disposed over the silicon substrate 51, and a patterned phosphorous doped oxide layer 54 disposed over the field oxide layer 53. A resistive layer 55 comprising tantalum aluminum is formed on the phosphorous oxide layer 54, and extends over areas where thin film resistors, including ink firing resistors 56, are to be formed beneath ink chambers 19. A patterned metallization layer 57 comprising aluminum doped with a small percentage of copper and/or silicon, for example, is disposed over the resistor layer 55.

The metallization layer 57 comprises metallization traces defined by appropriate masking and etching. The masking and etch of the metallization layer 57 also defines the resistor areas. In particular, the resistive layer 55 and the metallization layer 57 are generally in registration with each other, except that portions of traces of the metallization layer 57 are removed in those areas where resistors are formed. In this manner, the conductive path at an opening in a trace in the metallization layer includes a portion of the resistive layer 55 located at the opening or gap in the conductive trace. Stated another way, a resistor area is defined by providing first and second metallic traces that terminate at different locations on the perimeter of the resistor area. The first and second traces comprise the terminal or leads of the resistor which effectively include a portion of the resistive layer that is between the terminations of the first and second traces. Pursuant to this technique of forming resistors, the resistive layer 55 and the metallization layer can be simultaneously etched to form patterned layers in registration with each other. Then, openings are etched in the metallization layer 57 to define resistors. The ink firing resistors 56 are thus particularly formed in the resistive layer S5 pursuant to gaps in traces in the metallization layer 57.

A composite passivation layer comprising a layer 59 of silicon nitride ($Si_3N_4$) and a layer 60 of silicon carbide (SiC) is disposed over the metallization layer 57, the exposed portions of the resistive layer 55, and exposed portions of the oxide layer 53. A tantalum passivation layer 61 is disposed on the composite passivation layer 59, 60 over most of the thin film substructure 11 so as to be disposed over the heater resistors 56 and extending beyond the ink chambers 19. The tantalum passivation layer 61 can also extend to areas over which the patterned gold layer 62 is formed for external electrical connections to the metallization layer 57 by conductive vias 58 formed in the composite passivation layer 59, 60. An adhesion layer 63 comprised of a tantalum nitride layer is disposed on the tantalum layer 61 and functions as a barrier adhesion layer in areas where it is in contact with the barrier layer 12. Thus, to the extent that adhesion layer to barrier layer adhesion in desired in the vicinity of the ink chambers and ink channels, the interface between the adhesion layer 63 and the barrier 12 can extend for example from at least the region between the resistors 56 and the patterned gold layer 62 to the ends of the barrier tips 12_a_.

The invention also contemplates a tantalum nitride layer adhesion layer that is comprised of tantalum nitride subareas that are beneath ink chambers 19 and portions of associated ink channels 29 adjacent the ink chambers 19, wherein the subareas are shaped in accordance with the areas SA depicted in FIG. 3. The tantalum nitride subareas extend beyond the ink chamber 19 and the ink channels 29, and in this manner, the tantalum nitride subareas function as a barrier adhesion layer in the vicinity of the ink chambers 19 and the ink channels 29. By way of illustrative example, the tantalum nitride subareas are disposed on correspondingly shaped tantalum subareas that extend into areas that are subject to bubble collapse to provide mechanical passivation for the ink firing resistors by absorbing the cavitation pressure of the collapsing drive bubble.

Figure 5:
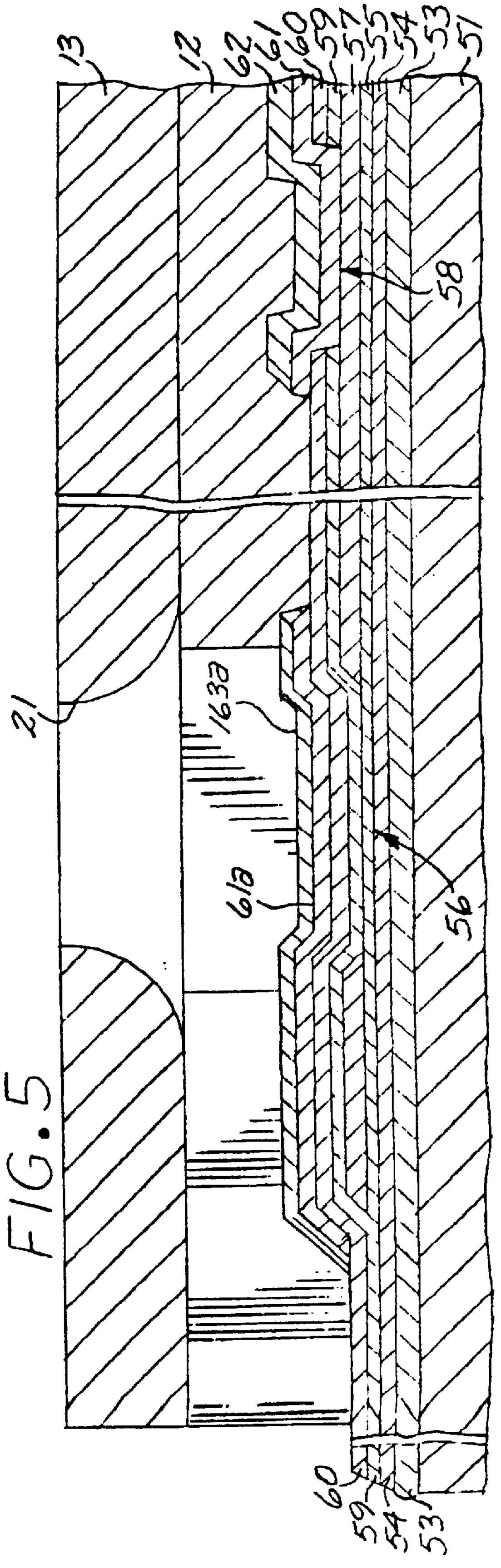
FIG. 5 sets forth an unscaled schematic cross sectional view of the ink jet printhead of FIG. 1 taken laterally through a representative ink drop generator region and illustrating another embodiment of the printhead of FIG. 1.

Referring now to FIG. 5, set forth therein is an unscaled schematic cross sectional view of the ink jet printhead of FIG. 1 taken laterally through a representative ink drop generator region and a portion of the patterned gold layer 62, and illustrating a specific embodiment of an ink jet printhead in accordance with the invention that includes barrier adhesion layer subareas that contain tantalum, carbon, fluorine, and oxygen, and which are formed pursuant to treatment of a tantalum layer with a plasma that contains a fluorinated hydrocarbon such as carbon tetrafluoride ($CF_4$), fluoroform ($CHF_3$), hexafluoroethane ($C_2F_6$), difluoromethane ($CH_2F_2$) pentafluoroethane ($C_2HF_5$), tetrafluoroethane ($C_2H_2F_4$), or octafluorobutene ($C_4F_8$). The ink jet printhead of FIG. 5 is similar to the ink jet printhead of FIG. 4, except that an adhesion layer 163 comprised of a tantalum, carbon, fluorine, and oxygen containing layer is limited to adhesion layer subareas 163_a_ that are formed pursuant to fluorocarbon plasma treatment of a tantalum layer 61 that includes corresponding tantalum subareas 61_a_. The adhesion subareas 163_a_ and corresponding tantalum subareas 61_a_ are beneath ink chambers 19 and portions of associated ink channels 29 adjacent the ink chambers 19. The subareas 163_a_ are shaped in accordance with the pattern SA depicted in FIG. 3, and extend beyond the ink chamber 19 and the ink channels 29. In this manner, the adhesion layer subareas 163_a_ function as a barrier adhesion layer in the vicinity of the ink chambers 19 and the ink channels 29. As a minimum, the tantalum subareas 61*a* extend into areas that are subject to bubble collapse to provide mechanical passivation for the ink firing resistors by absorbing the cavitation pressure of the collapsing drive bubble.

The invention also contemplates a blanket tantalum layer and a blanket tantalum, carbon, fluorine, and oxygen containing adhesion layer substantially similar to the tantalum layer and tantalum nitride layer shown in FIG. 4, except that the tantalum, carbon, fluorine, and oxygen containing adhesion layer would not extend beneath the gold areas.

The foregoing printhead is readily produced pursuant to standard thin film integrated circuit processing including chemical vapor deposition, photoresist deposition, masking, developing, and etching, for example as disclosed in commonly assigned U.S. Pat. No. 4,719,477 and U.S. Pat. No. 5,317,346, both previously incorporated herein by reference.

By way of illustrative example, the foregoing structures can be made as follows. Starting with the silicon substrate 51, any active regions where transistors are to be formed are protected by patterned oxide and nitride layers. Field oxide 53 is grown in the unprotected areas, and the oxide and nitride layers are removed. Next, gate oxide is grown in the active regions, and a polysilicon layer is deposited over the entire substrate. The gate oxide and the polysilicon are etched to form polysilicon gates over the active areas. The resulting thin film structure is subjected to phosphorous presupposition by which phosphorous is introduced into the unprotected areas of the silicon substrate. A layer of phosphorous doped oxide 54 is then deposited over the entire in-process thin film'structure, and the phosphorous doped oxide coated structure is subjected to a diffusion drive-in step to achieve the desired depth of diffusion in the active areas. The phosphorous doped oxide layer is then masked and etched to open contacts to the active devices.

The tantalum aluminum resistive layer 55 is then deposited, and the aluminum metallization layer 57 is subsequently deposited on the tantalum aluminum layer 55. The aluminum layer 57 and the tantalum aluminum layer 55 are etched together to form the desired conductive pattern. The resulting patterned aluminum layer is then etched to open the resistor areas.

The silicon nitride passivation layer 59 and the SiC passivation layer 60 are respectively deposited. A photoresist pattern which defines vias to be formed in the silicon nitride and silicon carbide layers 59, 60 is disposed on the silicon carbide layer 60, and the thin film structure is subjected to etching, which opens vias through the composite passivation layer comprised of silicon nitride and silicon carbide to the aluminum metallization layer.

As to an implementation that includes a tantalum nitride adhesion layer 63, the tantalum layer and the tantalum nitride layer are formed for example by sputtering. Tantalum targets are sputtered in an inert gas such as argon or krypton to form the tantalum layer. After the desired tantalum thickness is obtained, nitrogen is mixed with the inert gas while the tantalum target continues to be sputtered, which allows the formation of the tantalum nitride layer. By way of illustrative example, the tantalum layer has a thickness of approximately 5000 Angstroms, and the tantalum nitride layer has a thickness of about 1000 Angstroms.

The tantalum layer and tantalum nitride layer can be formed by use of an MRC Solaris physical vapor deposition apparatus wherein the tantalum nitride layer is formed using the following parameters:

| | |
|---|---|
| Power: | 4 Kwatts |
| Temperature: | 400 degrees Centigrade |
| Pressure: | 15 mTorr |
| Argon: | 40 sccm/minute |
| Nitrogen: | 20 sccm/minute |

The total time of gas flow depends on the desired thickness of the tantalum nitride.

The gold layer 62 for external connections is deposited, and the gold layer 62, tantalum nitride layer, and tantalum layer are etched pursuant to a first mask, which defines the areas of the tantalum nitride layer and the tantalum layer. The gold layer 62 is then further etched pursuant to a second mask to expose portions of the tantalum nitride adhesion layer. To the extent that tantalum nitride subareas and tantalum subareas are formed, tantalum nitride areas would be present beneath the gold areas as a result of etching with the first mask, as shown in FIG. 4.

As to an implementation wherein the barrier adhesion layer comprises a tantalum, carbon, fluorine, and oxygen containing transition layer, the tantalum layer is formed for example by sputtering tantalum targets in an inert gas such as argon or krypton. The gold layer 62 for external connections is deposited, and the gold layer 62 and the tantalum layer are etched pursuant to a first mask, which defines the areas of the tantalum layer. The gold layer 62 is then further etched pursuant to a second mask to expose portions of the tantalum layer. The exposed tantalum is subjected to a plasma containing a fluorinated hydrocarbon (such as carbon tetrafluoride ($CF_4$), fluoroform ($CHF_3$), hexafluoroethane ($C_2F_6$), difluoromethane ($CH_2F_2$), pentafluoroethane ($C_2HF_5$), tetrafluoroethane ($C_2H_2F_4$), or octafluorobutene ($C_4F_8$), or a fluorinated hydrocarbon and argon, for example in a reactive ion etcher, which removes the surface oxide on the tantalum layer and causes formation of a deposited transition layer film 163 which after exposure to air contains tantalum, carbon, fluorine, and oxygen. By way of illustrative example, the tantalum layer has a thickness of approximately 5000 Angstroms, and the tantalum, carbon, fluorine, and oxygen containing barrier adhesion layer has a thickness in the range of about 60 to 100 Angstroms.

The tantalum, carbon, fluorine, and oxygen containing barrier adhesion layer can be formed by use of a Lam Research Corp. 384T reactive ion etcher with the following parameters:

| | |
|---|---|
| Power: | 750 Watts |
| Temperature: | ambient or higher |
| Pressure: | 170 mTorr |
| $CF_4$: | 150 sccm for 10 sec. |

Alternatively, $CF_4$ at 100 sccm/minute and Argon at 100 sccm/minute for 10 seconds can be used instead of $CF_4$ alone.

After the thin film substructure 11 is formed, the ink barrier layer 12 is heat and pressure laminated onto the thin film substructure. The orifice plate 13 is then laminated onto the laminar structure comprised of the ink barrier layer 12 and the thin film substructure 11.

While the foregoing embodiments include a tantalum passivation layer over the heater resistors, it should be appreciated that a single tantalum nitride layer can replace the tantalum and tantalum nitride layers. The invention further contemplates other transition metal nitride films such as tungsten nitride and titanium nitride.

The foregoing has thus been a disclosure of an ink jet printhead having a transition metal nitride layer or a tantalum, carbon, fluorine, and oxygen containing layer formed pursuant to a fluorinated hydrocarbon plasma treatment of a transition metal, which layer functions as a barrier adhesion layer, and which provides a further advantage of improved print quality by functioning as a kogation limiter in the ink chambers.

Although the foregoing has been a description and illustration of specific embodiments of the invention, various modifications and changes thereto can be made by persons skilled in the art without departing from the scope and spirit of the invention as defined by the following claims.

What is claimed is:

1. A thin film ink jet printhead, comprising:

a thin film substrate including a plurality of thin film layers;

a plurality of ink firing heater resistors defined in said plurality of thin film layers;

a transition metal nitride layer disposed on said plurality of thin film layers;

an ink barrier layer disposed over said transition metal nitride layer; and respective ink chambers formed in said ink barrier layer over respective thin film resistors, each chamber formed by a chamber opening in said barrier layer.

2. The ink jet printhead of claim 1 wherein said transition metal nitride layer is disposed over said heater resistors and extends beyond said ink chambers.

3. The ink jet printhead of claim 2 wherein:

said thin film resistors are arranged along a feed edge of said substrate;

said ink chambers are formed by barrier tips that extend between resistors toward said feed edge from a region on a side of the resistors opposite said feed edge; and said transition metal nitride layer extends along said barrier tips from said region on a side of the resistors opposite said feed edge.

4. The ink jet printhead of claim 3 wherein said feed edge comprises an outer edge of said substrate.

5. The ink jet printhead of claim 3 wherein said feed edge is formed by a slot in the middle of said substrate.

6. The ink jet printhead of claims 1, 2, 3, 4 or 5 wherein said transition metal nitride layer comprises tantalum nitride.

7. The ink jet printhead of claims 1, 2, 3, 4 or 5 further including a transition metal layer underlying said transition metal nitride layer.

8. The ink jet printhead of claims 1, 2, 3, 4 or 5 wherein said transition metal nitride layer comprises tantalum nitride and further including a tantalum layer underlying said tantalum nitride layer.

9. A thin film ink jet printhead, comprising:

a thin film substrate including a plurality of thin film layers;

a plurality of ink firing heater resistors defined in said plurality of thin film layers;

a transition metal layer disposed on said plurality of thin film layers;

a transition metal, carbon, fluorine, and oxygen containing barrier adhesion layer disposed on said patterned transition metal layer, wherein said transition metal, carbon, fluorine and oxygen containing layer is formed pursuant to exposure of said transition metal layer to a plasma that includes a fluorinated hydrocarbon;

an ink barrier layer disposed over said containing transition metal, carbon, fluorine and oxygen containing layer; and respective ink chambers formed in said ink barrier layer over respective thin film resistors, each chamber formed by a chamber opening in said barrier layer.

10. The ink jet printhead of claim 9 wherein said transition metal layer is disposed over said heater resistors and extends beyond said ink chambers.

11. The ink jet printhead of claim 10 wherein:

said thin film resistors are arranged along a feed edge of said substrate;

said ink chambers are formed by barrier tips that extend between resistors toward said feed edge from a region on a side of the resistors opposite said feed edge; and said transition metal layer extends along said barrier tips from said region on a side of the resistors opposite said feed edge.

12. The ink jet printhead of claim 11 wherein said feed edge comprises an outer edge of said substrate.

13. The ink jet printhead of claim 11 wherein said feed edge is formed by a slot in the middle of said substrate.

14. The ink jet printhead of claims 10, 11, 12 or 13 wherein said transition metal layer comprises tantalum.

15. The ink jet printhead of claims 10, 11, 12 or 13 wherein said transition metal layer comprises tantalum, and wherein said fluorinated hydrocarbon comprises carbon tetrafluoride.

16. The ink jet printhead of claims 10, 11, 12 or 13 wherein said transition metal layer comprises tantalum, and wherein said fluorinated hydrocarbon comprises hexafluoroethane.

17. A method of making an ink jet printhead substructure comprising the steps of:

providing a substrate;

forming a plurality of heater resistors on the substrate;

forming a transition metal nitride barrier adhesion layer over the heater resistors; and attaching an ink barrier layer to said transition metal barrier adhesion layer.

18. The method of claim 17 wherein said transition metal comprises tantalum.

19. A method of making an ink jet printhead substructure comprising the steps of:

providing a substrate;

forming a plurality of heater resistors on the substrate;

forming a transition metal passivation layer over said heater resistors;

plasma treating said transition metal passivation layer with a fluorinated hydrocarbon to form a deposited transition metal, carbon, fluorine, and oxygen containing barrier adhesion layer; and attaching an ink barrier layer to said transition metal, carbon, fluorine, and oxygen containing barrier adhesion layer.

20. The method of claim 19 wherein said transition metal comprises tantalum.

21. The method of claim 19 wherein said fluorinated hydrocarbon comprises carbon tetrafluoride.

22. The method of claim 19 wherein said fluorinated hydrocarbon comprises hexafluoroethane.

* * * * *

UNITED STATES PATENT AND TRADEMARK OFFICE

CERTIFICATE OF CORRECTION

PATENT NO. : 6,441,838 B1 Page 1 of 1
DATED : August 27, 2002
INVENTOR(S) : Gregory T. Hindman et al.

It is certified that error appears in the above-identified patent and that said Letters Patent is hereby corrected as shown below:

Column 9, line 15 through Column 10, line 34,
Claims 1 through 16 should be deleted Signed and Sealed this First Day of July, 2003

JAMES E. ROGAN
*Director of the United States Patent and Trademark Office*